United States Patent
Fitzgerald et al.

(10) Patent No.: US 10,726,047 B2
(45) Date of Patent: Jul. 28, 2020

(54) EARLY THREAD RETURN WITH SECONDARY EVENT WRITES

(71) Applicant: MICROSOFT TECHNOLOGY LICENSING, LLC, Redmond, WA (US)

(72) Inventors: Robert Patrick Fitzgerald, Fall City, WA (US); Per-Ake Larson, Redmond, WA (US); Michael James Zwilling, Bellevue, WA (US); Cristian Diaconu, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 252 days.

(21) Appl. No.: 15/967,275

(22) Filed: Apr. 30, 2018

(65) Prior Publication Data

US 2018/0246949 A1    Aug. 30, 2018

Related U.S. Application Data

(63) Continuation of application No. 15/001,095, filed on Jan. 19, 2016, now Pat. No. 9,965,538.

(51) Int. Cl.
*G06F 16/27* (2019.01)
*G06F 11/20* (2006.01)
(Continued)

(52) U.S. Cl.
CPC ............ *G06F 16/273* (2019.01); *G06F 9/466* (2013.01); *G06F 11/2094* (2013.01); *G06F 11/2097* (2013.01); *G06F 11/1474* (2013.01)

(58) Field of Classification Search
CPC ............... G06F 16/273; G06F 11/2094; G06F 11/2097; G06F 11/1474; G06F 9/466
(Continued)

(56) References Cited

U.S. PATENT DOCUMENTS

| | | | |
|---|---|---|---|
| 8,103,714 B2* | 1/2012 | Dorai | G06F 9/466 709/201 |
| 8,438,421 B2* | 5/2013 | Lind | G06F 9/466 714/15 |

(Continued)

OTHER PUBLICATIONS

Huang, Jian-hua, et al., "The design and implement of the centralized log gathering and analysis system", CSAE 2012, Zhangjiajie, China, May 25-27, 2012, pp. 268-273.*

*Primary Examiner* — Robert Stevens
(74) *Attorney, Agent, or Firm* — Workman Nydegger

(57) ABSTRACT

A log manager causing events to be written to the primary and the secondary computing systems for high availability, and returning threads quickly. Rather than cause every event write to be immediately written to the secondary computing system, the log management component is triggered to write to the secondary computing system upon detecting event write requests of event writes of a particular event type. In response to detecting such an event write, the log management component gathers a group of event writes corresponding to that particular event write, and dispatches the event writes as a group. The particular thread that initiated the particular event write of the particular event type is returned after dispatching the event write group, but before or without confirmation of the particular event write group has been written to the secondary computing system.

20 Claims, 11 Drawing Sheets

(51) Int. Cl.
*G06F 9/46* (2006.01)
*G06F 11/14* (2006.01)

(58) Field of Classification Search
USPC .......................................................... 707/615
See application file for complete search history.

(56) References Cited

U.S. PATENT DOCUMENTS

| | | | | |
|---|---|---|---|---|
| 9,183,245 | B2* | 11/2015 | Schreter | G06F 16/2358 |
| 2011/0276611 | A1* | 11/2011 | Verma | G06F 16/1865 |
| | | | | 707/826 |
| 2013/0042156 | A1* | 2/2013 | Srinivasan | G06F 11/1443 |
| | | | | 714/54 |
| 2014/0115016 | A1* | 4/2014 | Perrin | G06F 11/1435 |
| | | | | 707/825 |
| 2014/0297595 | A1* | 10/2014 | Larson | G06F 11/1471 |
| | | | | 707/648 |
| 2014/0297608 | A1* | 10/2014 | Larson | G06F 11/1471 |
| | | | | 707/695 |
| 2015/0149426 | A1* | 5/2015 | Kim | G06F 3/0604 |
| | | | | 707/703 |
| 2016/0283331 | A1* | 9/2016 | Barber | G06F 16/254 |

* cited by examiner

|  | Received | Held |
|---|---|---|
| *Figure 5A* → | N1$_A$ | N1$_A$ |
| *Figure 5B* → | N2$_B$ | N2$_B$ N1$_A$ |
| *Figure 5C* → | N3$_A$ | N3$_A$ N2$_B$ N1$_A$ |
| *Figure 5D* → | N1$_A$ | N1$_A$ N3$_A$ N2$_B$ N1$_A$ |
| *Figure 5E* → | Y1$_A$ | N2$_B$ |
| *Figure 5F* → | N2$_B$ | N2$_B$ N2$_B$ |
| *Figure 5G* → | Y3$_A$ | N2$_B$ N2$_B$ |
| *Figure 5H* → | Y2$_B$ |  |

US 10,726,047 B2

EARLY THREAD RETURN WITH SECONDARY EVENT WRITES

CROSS-REFERENCE TO RELATED APPLICATIONS

This application is a continuation of U.S. patent application Ser. No. 15/001,095 filed on Jan. 19, 2016, entitled "EARLY THREAD RETURN WITH SECONDARY EVENT WRITES," which issued as U.S. Pat. No. 9,965,538 on May 8, 2018, and which application is expressly incorporated herein by reference in its entirety.

BACKGROUND

For a wide variety of reasons, computing systems often keep a log of certain events. Such logs may be helpful for diagnosing emergent or existing problems, recovering from a failure of the computing system, performing incremental backup of the computing system, tracking computing performance, evaluating security, and so forth.

Some logs are persisted on disk in order to survive system failure. After all, some logs have their purpose in being used after a system failure, such as when used for recovery, or to diagnose reasons for the failure. Often, in order to provide high availability, writes that are made to one computing system (also called a primary computing system) are also made to a secondary computing system, so that the secondary is ready to take over if the primary is not performing.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to a primary computing system that has one or more event writing components that request logging of events. A log management component causes such events to be written to the primary computing system as well as causes at least some of the events to be written to a secondary computing system. The primary and secondary computing systems are redundant to thereby provide high availability of the service(s) offered by the primary computing system, and high availability of the data represented by the event writes. However, notwithstanding that the event writes are being provided to a secondary, the threads that initiate the event writes may be returned quickly, thus allowing threads to be efficiently used, with little waiting time on account of the event logging.

The log management component is triggered to write to the secondary computing system upon detecting event write requests of event writes of a particular event type (e.g., transaction commit event writes). In response to detecting such an event write of that particular event type, the log management component gathers a group of event writes corresponding to that particular event write, and dispatches the event writes as a group. For instance, if the particular event type is a commit transaction event type, perhaps the event writes that belong to the same transaction as the commit transaction event write are written as a group to the secondary computing system. Perhaps also, event writes that were initiated by the same thread as the thread that initiated the commit transaction event write are also grouped for dispatch.

The particular thread that initiated the particular event write of the particular event type is returned after dispatching the group of events, but before or without confirmation of the particular event write being written to the secondary computing system. Accordingly, the latency of the thread return is very low. This is particular true when the grouping is by transaction and triggered by the transaction commit event write.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 5A through 5H illustrates eight successive states of an example in which various threads write event writes associated with a variety of transactions, and an example of how the method of FIG. 4 could be repeatedly applied in such a scenario;

DETAILED DESCRIPTION

Figure 1:
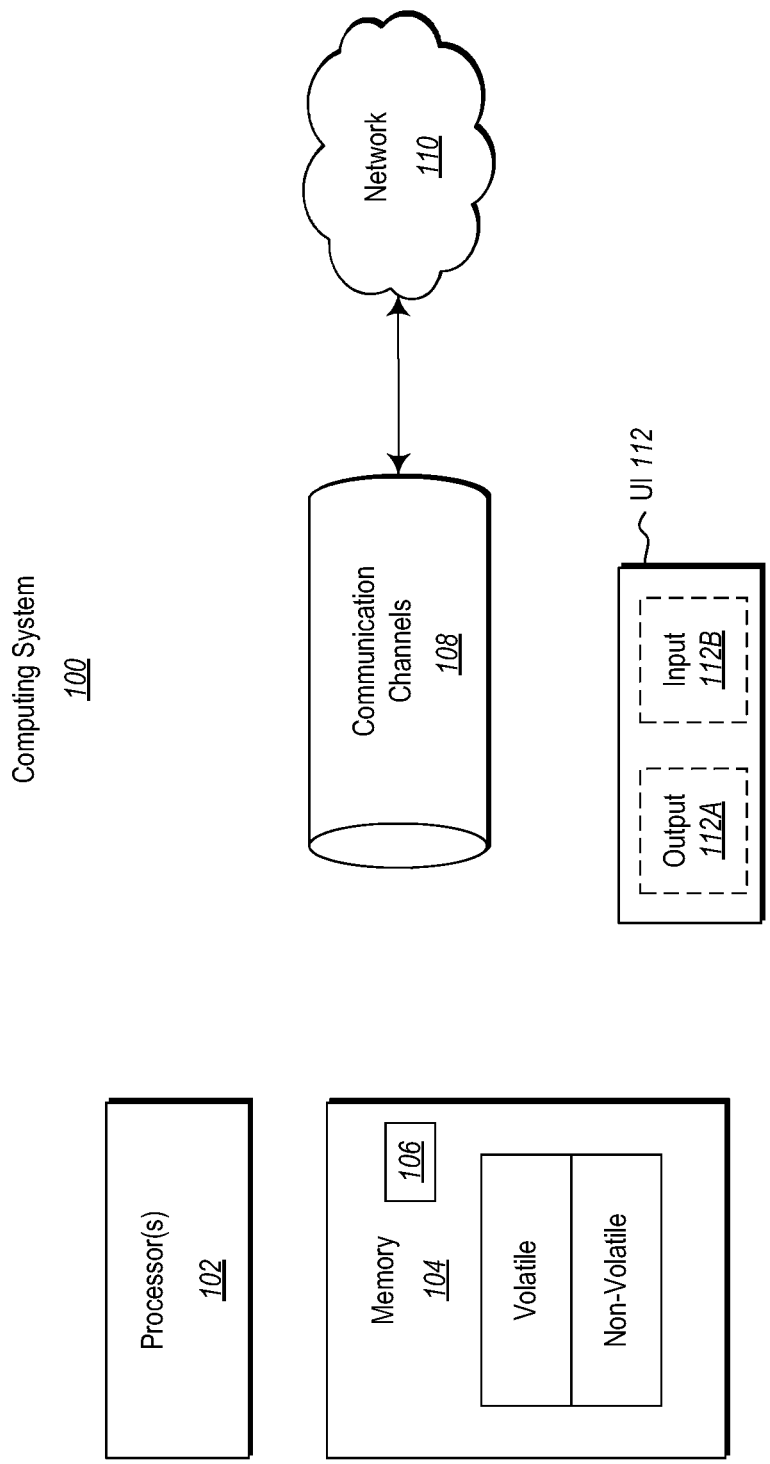
FIG. 1 illustrates an example computing system in which the principles described herein may be employed.

At least some embodiments described herein relate to a primary computing system that has one or more event writing components that request logging of events. A log management component causes such events to be written to the primary computing system as well as causes at least some of the events to be written to a secondary computing system. The primary and secondary computing systems are redundant to thereby provide high availability of the service(s) offered by the primary computing system, and high availability of the data represented by the event writes. However, notwithstanding that the event writes are being provided to a secondary, the threads that initiate the event writes may be returned quickly, thus allowing threads to be efficiently used, with little waiting time on account of the event logging.

The log management component is triggered to write to the secondary computing system upon detecting event write requests of event writes of a particular event type (e.g., transaction commit event writes). In response to detecting such an event write of that particular event type, the log management component gathers a group of event writes corresponding to that particular event write, and dispatches the event writes as a group. For instance, if the particular event type is a commit transaction event type, perhaps the event writes that belong to the same transaction as the commit transaction event write are written as a group to the secondary computing system. Perhaps also, event writes that were initiated by the same thread as the thread that initiated the commit transaction event write are also grouped for dispatch.

The particular thread that initiated the particular event write of the particular event type is returned after dispatching the group of events, but before or without confirmation of the particular event write being written to the secondary computing system. Accordingly, the latency of the thread return is very low. This is particular true when the grouping is by transaction and triggered by the transaction commit event write.

Some introductory discussion of a computing system will be described with respect to FIG. 1. Then, the event writing in accordance with the principles described herein will be described with respect to FIGS. 2 through 5H. Thereafter, an example implementation in which event writes may be efficiently and durably made to the primary computing system will be described with respect to FIGS. 6 through 10C.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2:
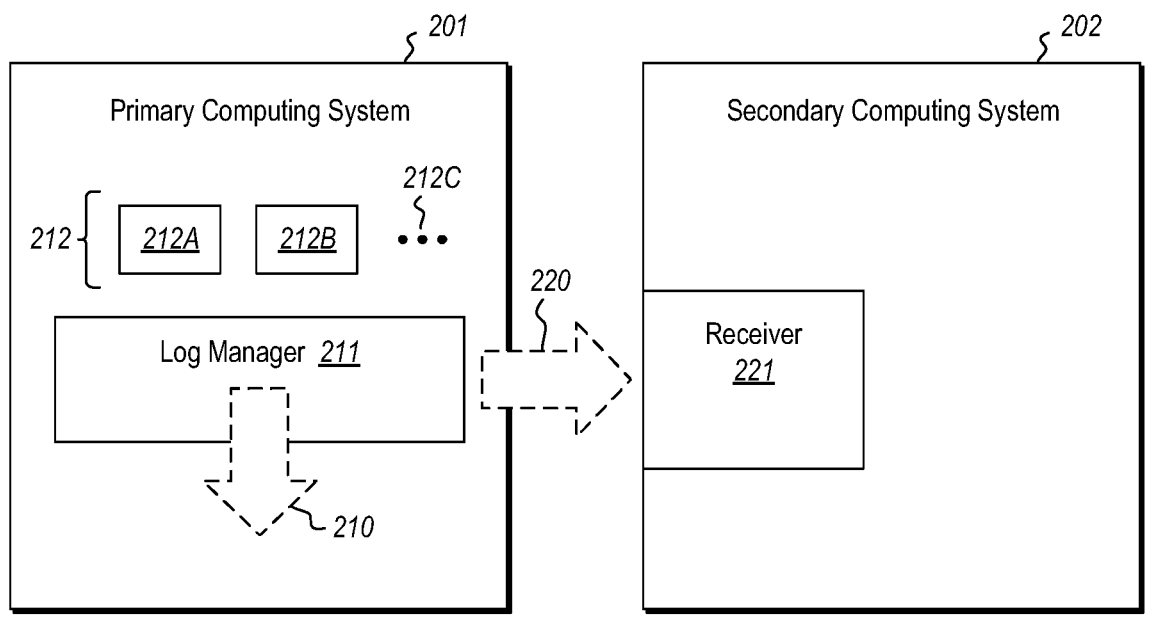
FIG. 2 illustrates a network environment that includes a primary computing system and a secondary computing system that provides high availability for the primary computing system.

FIG. 2 illustrates a network environment 200 that includes a primary computing system 201 and a secondary computing system 202. Each of the computing systems 201 and 202 may be structured as described above for the computing system 100 of FIG. 1. The secondary computing system 202 serves to provide high availability of the services and/or data of the primary computing system 201. In one example, the secondary computing system 202 may even be a replica of the primary computing system 201. Because high availability of services and data is important in a cloud computing environment, in one embodiment, the secondary computing system 202 operates in a cloud computing environment. The primary computing system 201 may be a client machine, with the secondary computing system 202 providing potential recovery services. However, the primary computing system 201 may be operating as a server, or perhaps also in a cloud computing environment.

The primary computing system 201 includes one or more events writing components 212 that request logging of events. Although two event writing components 212A and 212B are illustrated in FIG. 2, there may be any number of writing components on the primary computing system 201 as represented by the ellipses 212C. The writing components are examples of the executable component 106 of FIG. 1, and may be any executable component for which events are to be logged.

The primary computing system 201 also includes a log management component 201 (also an example of the executable component 106 of FIG. 1) that causes events generated or communicated by the event writing components 212 to be written both to the primary computing system 201 and to the secondary computing system 202. For instance, the log management component 211 causes such events to be written on the primary computing system 201 as represented by arrow 210. Furthermore, the log management component 211 causes at least some of those events to be also written to the secondary computing system as represented by arrow 220. The event writes are received at the secondary computing system 202 at the receiver 221. In this description and in the claims, an "event write request" is simply any data structure that triggers the log management component to perform an event write. The event writing components themselves need not even have any recognition that they are generating or communicating events that will be written.

Figure 3:
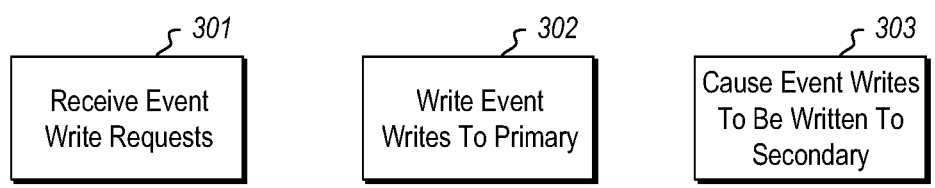
FIG. 3 illustrates a flowchart of a method for writing events to a primary computing system and a secondary computing system.

FIG. 3 illustrates a flowchart of a method 300 for writing events to a primary computing system and a secondary computing system. The method 300 may be performed by the log management component 211 of FIG. 2. The method 300 includes receiving one or more event write requests from one or more event writing components (act 301). In response to each of at least some of those requests, the log management writes the corresponding event writes (act 302) on a primary computing system. In addition, the log management component causes at least some of the event writes to be written to the secondary computing system (act 303). Note that acts 301 through 303 are shown as occurring in parallel. This is because the event writes will typically be processed as a flow for multiple event writes as each event write request comes in. Accordingly, while subsequent event writes are being received in act 301, prior event writes are being written to the primary computing system 201 (act 302) and to the secondary computing system (act 303).

In some embodiments, the event writes are written to the primary computing system such that the event writes would still be logged even if after a crash of the primary computing system. One technical solution for how this may be accomplished with low latency will be described below with respect to FIGS. 6 through 10C. However, the event writes may also be dispatched to the secondary computing system 202 such that even if the secondary computing system 202 was not ready to process the event writes, the event writes would be processed. The technical solution to this will be described below with respect to acts 411 and 412 of FIG. 4, and with respect to the receiver 221 of FIG. 2.

Figure 4:
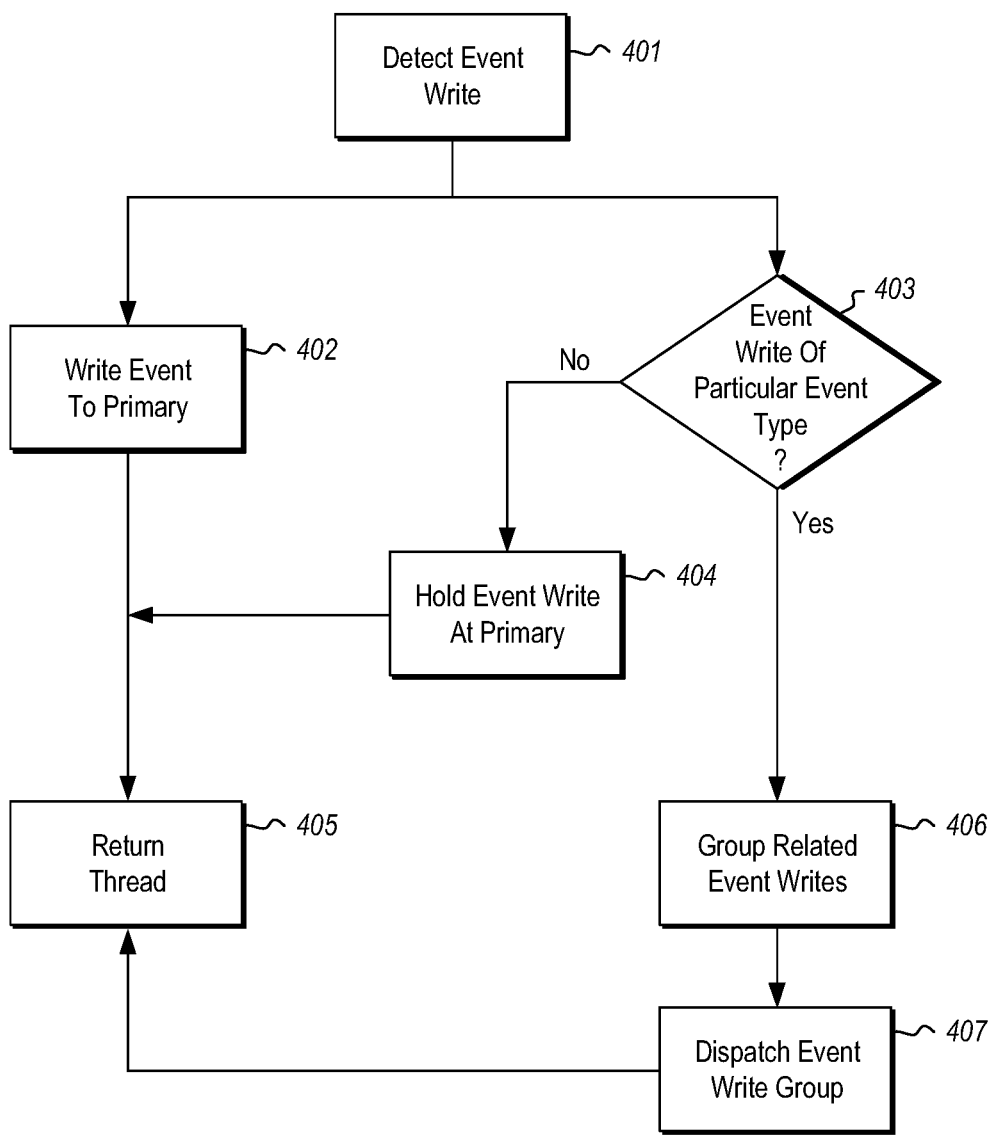
FIG. 4 illustrates a flowchart of a method for processing an event write, and represents an example processing flow that occurs for each event write request.

FIG. 4 illustrates a flowchart of a method 400 for processing an event write, and represents an example processing flow that occurs for each event write request. First, the log management component detects an event write request of an event write (act 401). The event write is then written to the primary computing system (act 402). Furthermore, rather than write every event write immediately also to the secondary computing system, the log management component postpones event writes that are not of a particular event type.

For instance, it is also determined whether or not the event write is of a particular event type (decision block 403). The particular event type may be such that when an event of that event type is received, it is likely that there is a grouping of event writes that can be efficient made. As an example, in a transactional system, the particular event type might be a transaction commit event write request. That would be indicative of there being one or more other event writes of the same transaction that could be grouped with the transaction commit event write of that transaction.

If the event write is not of the particular event type ("No" in decision block 403), then the event write is held (act 404) for future dispatch to the secondary computing system. Then, the thread that initiated the event write may be returned once the event write has been durably made to the primary computing system 201. Accordingly, once the event write is made to the primary computing system 201 (act 402), and held (act 404) for future transmission to the secondary computing system, the thread that initiated the event write may be returned (act 405).

If the event write is of the particular event type ("Yes" in decision block 403), then a group of events corresponding to the event write are grouped together (act 406) and dispatched (act 407) to the secondary computing system. For instance, in the case of the particular event type being of a particular transaction commit event, the grouping of event writes may include all (or at least some) of the event writes that have been held for that same transaction. Alternatively or in addition, the grouping of event writes might also include event writes that were initiated by the same thread as the thread that initiated the particular event write. The thread is then returned (act 405). When a thread is returned, the expectation is often that all event writes initiated by that thread have been durably written.

When dispatching to the secondary computing system (act 407), the dispatch may include making the group of event writes accessible by the secondary computing system without further intermediation of the primary computing system. If the receiver 221 of the secondary computing system is a hardware receiver that is capable of receiving the dispatched a group of event writes without receiving a preparation instruction from the primary computing system, there is nothing further that is to be done other than what is shown in FIG. 4. In that case, even if the secondary computing system 202 was not itself ready to receive the dispatched group of event writes, the event writes would be present in the hardware receiver when the secondary computing system 202 was ready to process the event write group.

However, if the receiver 221 is a software receiver, then perhaps more would be done to ensure that the software receiver was in a prepared state sufficient to receive the event write group so that the secondary computing system 202 can process the event write group. In that case, the log management component 211 confirms that the software receiver is in the prepared state such that dispatch of the event write group alone is sufficient to have high confidence that the event write group will be processed by the secondary computing system 202, and thus that the secondary computing system 202 provides the high availability of that event write group. If the software receiver is not in the prepared state, the log management component 211 may issue dispatch a preparation instruction to the secondary computing system 202, the preparation instruction structured to be interpretable by the secondary computing system to trigger the software receiver to be in the prepared state. Once the software receiver is confirmed in the prepared state, the event write group is dispatched to the secondary computing system (act 407).

An example will now be provided with respect to FIGS. 5A through 5H. In this example, the log management component receives one event write at a time. Furthermore, in the nomenclature used, there are event writes associated with three transactions 1, 2 and 3 being written. An event write that is not a commit transaction event write will be represented as NX, where "X" represents that transaction identifier. For instance, N1 is an event write for transaction 1 that is not the commit transaction event write. An event write that is a commit transaction event write will be represented as YX, where "X" again represents the transaction identifier. For instance, Y1 is a commit transaction event write for transaction 1. A subscript will be used to represent thread that initiated the event write. In this example, the threads are identified as thread A and thread B. The thread that initiated the event write will be represented as a subscript. Accordingly, $Y1_A$ is a commit transaction event write for transaction 1 that was initiated by thread A.

First, as illustrated in FIG. 5A on the left hand side, event write $N1_A$ (a non-commit transaction event for transaction 1 initiated by thread A) is received, which triggers method 400 of FIG. 4 as act 401. The event write $N1_A$ is written to the primary computing system (act 402), but because this event $N1_A$ is not a commit transaction event write ("No" in decision block 403), the event $N1_A$ is held (act 404) as represented in the right hand side of FIG. 5A. The thread A may then be returned (act 405).

Second, as illustrated in FIG. 5B on the left hand side, event write $N2_B$ (a non-commit transaction event for transaction 2 initiated by thread B) is received, which triggers method 400 of FIG. 4 as act 401. The event write $N2_B$ is written to the primary computing system (act 402). However, because this event $N2_B$ is not a commit transaction event write ("No" in decision block 403), the event $N2_B$ is held (act 404) as represented in the right hand side of FIG. 5B in which events $N2_B$ and $N1_A$ are held. The thread B may then be returned (act 405).

Third, as illustrated in FIG. 5C on the left hand side, event write $N3_A$ (a non-commit transaction event for transaction 3 initiated by thread A) is received, which triggers method 400 of FIG. 4 as act 401. The event write $N3_A$ is written to the primary computing system (act 402). However, because this event $N3_A$ is not a commit transaction event write ("No" in decision block 403), the event $N3_A$ is held (act 404) as represented in the right hand side of FIG. 5C in which $N3_A$, $N2_B$ and $N1_A$ are held. The thread A may then be returned (act 405).

Fourth, as illustrated in FIG. 5D on the left hand side, event write $N1_A$ (another non-commit transaction event for transaction 1 initiated by thread A) is received, which triggers method 400 of FIG. 4 as act 401. The event write $N1_A$ is written to the primary computing system (act 402). However, because this event $N1_A$ is not a commit transaction event write ("No" in decision block 403), the event $N1_A$ is held (act 404) as represented in the right hand side of FIG. 5D in which $N1_A$, $N3_A$, $N2_B$ and the first $N1_A$ are held. The thread A may then be returned (act 405).

Fifth, as illustrated in FIG. 5E on the left hand side, event write $Y1_A$ (a commit transaction event for transaction 1 initiated by thread A) is received, which triggers method 400 of FIG. 4 as act 401. The event write $Y1_A$ is written to the primary computing system (act 402). This event $Y1_A$ is a commit transaction event write ("Yes" in decision block 403). Accordingly, related event writes are grouped (act 406). For instance, all of the event writes that are for transaction 1 or that were initiated by thread A (regardless of whether the initiated event write was for transaction 1) are grouped. This group would thus include of course the commit transaction event write $Y1_A$ as well as the other event writes $N1_A$ and $N1_A$ associated with transaction 1, as well as the event write $N3_A$ that belongs to a completely different transaction 3—but that was initiated by the thread A. The group of thread writes $Y1_A N1_A N3_A N1_A$ would then be dispatched (act 407), and the thread A returned (act 405). As shown in the right half of FIG. 5E, this leaves only event write $N2_B$ being held at the primary computing system.

Sixth, as illustrated in FIG. 5F on the left hand side, another event write $N2_B$ (a second non-commit transaction event for transaction 2 initiated by thread B) is received, which triggers method 400 of FIG. 4 as act 401. The event write $N2_B$ is written to the primary computing system (act 402). However, because this event $N2_B$ is not a commit transaction event write ("No" in decision block 403), the event $N2_B$ is held (act 404) as represented in the right hand side of FIG. 5F in which the two $N2_B$s–$N2_B$ and $N2_B$ are held. The thread B may then be returned (act 405).

Seventh, as illustrated in FIG. 5G on the left hand side, another event write $Y3_A$ (a commit transaction event for transaction 3 initiated by thread A) is received, which triggers method 400 of FIG. 4 as act 401. The event write $Y3_A$ is written to the primary computing system (act 402). Furthermore, because the event write $Y3_A$ is a commit transaction event write ("Yes" in decision block 403), the grouping occurs (act 406). However, there are no other event writes for transaction 3 that have been held. A non-commit transaction event $N3_A$ exists for transaction 3, but that had been previously transmitted in association with FIG. 5E. Furthermore, there are no other event writes that are being held by the primary computing system. There are only presently event writes associated with thread B. Accordingly, in this case, the grouping results in only the event write $Y3_A$ being transmitted (act 407). In this case, there is no change in what is being held at the primary computing system. The event writes $N2_B$ and $N2_B$ are held.

Lastly, in this example, suppose that as illustrated in FIG. 5H on the left hand side, another event write $Y2_B$ (a commit transaction event for transaction 2 initiated by thread B) is received, which triggers method 400 of FIG. 4 as act 401. The event write $Y2_B$ is written to the primary computing system (act 402). Furthermore, because the event write $Y2_B$ is a commit transaction event write ("Yes" in decision block 403), the grouping occurs (act 406). Now, all remaining event writes, $Y2_B$ and the two $N2_B$s are grouped together and dispatched to the secondary computing system (act 407), leaving no remaining event writes at the primary computing system, as represented in the right half of FIG. 5H.

Accordingly, even though event writes may be temporarily held at the primary computing system, those event writes are ultimately dispatched to the secondary computing system. In one embodiment, as previously mentioned, the events are held at the primary computing system in a manner that, even if the primary computing system were to crash, the event write would still be logged at the primary computing system, and dispatched to the secondary computing system. In the example, of FIGS. 6 through 10, this is does using a persistent main memory at the primary computing system.

Figure 6:
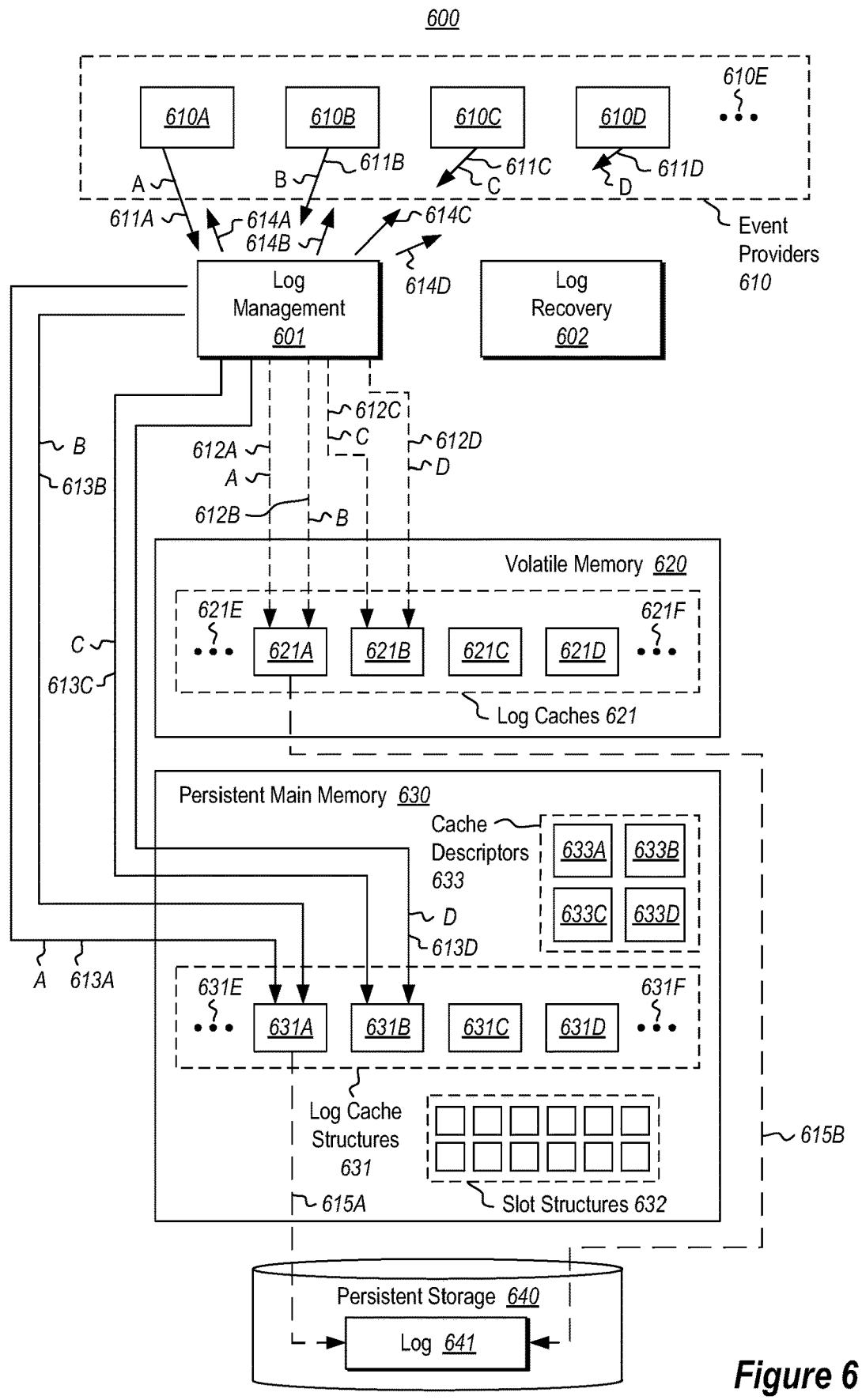
FIG. 6 illustrates a system in which a log management component may log events with low latency in a manner that should failure occur, a recovery component may successful recover.

FIG. 6 illustrates a system 600 in accordance with the principles described herein. The system includes a log management component 601 and a log recovery component 602, which may be structured as described above for the executable component 106 of FIG. 1. Furthermore, the system 600 may be structured as described above for the computing system 100 of FIG. 1. The log management component 601 causes events to be written to a persistent main memory 630 such that they will either be written to the log 641 through normal operation or recovery operation (in other words, such the logging of the event is virtually certain if not absolutely certain).

The system 600 includes a set 610 of event providers that provides events to the log management component 601 for logging. The set 610 is an example of the event write providers 212 of FIG. 2. For instance, in an example, event provider 610A first provides an event (called hereinafter "event A") as represented by arrow 611A; event provider 610B then provides an event (called hereinafter "event B") as represented by arrow 611B; event provider 610C then provides an event (called hereinafter "event C") as represented by arrow 611C; and event provider 610D then provides an event (called hereinafter "event D") as represented by arrow 611D. Accordingly, in this example, log management component 601 receives the following events for logging in this order: event A, event B, event C, and event D. The rate at which the log management component 601 receives events for logging may vary over time. The ellipses 610E are provided to symbolize flexibility in the number of event providers providing events to be logged.

As each event is received, the log management component 601 writes the events into a persistent main memory 630 in a manner that if failure was to occur prior to the event getting written to the log, the recovery component 602 would be able to provide the event to a log 641 that is stored in a persistent store 640 during recovery. However, if no recovery was needed, in the normal course of operation, the event would eventually end up identified within a log 641 that is stored in a persistent store 640. If a failure occurs, during subsequent recovery, the recovery component 602 is triggered to use the log 641 in persistent storage 640 as well as events written to the persistent main memory 630 in order to perform recovery.

Events that are successfully written to the persistent main memory 630 are written in a manner that the recovery component 602 will eventually operate to cause the event to be included within the log 641 of the persistent store 640, and dispatched to the secondary computing system. Accordingly, a successful write to the persistent main memory 630 ensures that the event will be logged at both the primary and secondary computing systems even if a failure was to occur after the successful write. Accordingly, success of the writing of the event can be determined immediately upon a successful write of the event to the persistent main memory 630, rather than waiting until confirmation that the event has actually been written into the log 641 of the persistent store 640. Accordingly, the thread that initiated the write can be returned almost immediately, and once the write has successfully completed to the persistent main memory 630.

This results in orders of magnitude lower latency between the time that the thread initiates the write of the event until the time that the thread is released. Conventionally, any threads that initiated writes of events to a log cache had to collectively wait for the confirmation that the contents of the log cache had been written to the persistent store. This resulted in latency from not just the I/O operation to the persistent store itself, but also prior to that from waiting for the log cache to fill sufficiently to initiate that I/O operation in the first place. Furthermore, because acknowledgement of receipt by the secondary computing system is not awaited prior to returning the thread, the event write to the secondary also does not significantly delay the thread return.

More specifically, the persistent main memory 630 includes multiple log cache structures 631 into which events are written—one log cache structure at a time being ready for receiving events. For instance, four log cache structures 631A, 631B, 631C and 631D are illustrated in FIG. 6. However, the ellipses 631E and 631F represent that there may be other numbers as well. In one example, there may be over a hundred of such log cache structures. The log cache structures are filled with events until the log cache structure is full or until a certain time has elapsed, at which time the events corresponding to the log cache structure are serialized and placed into the log 641 via an I/O operation. In the example in which events A through D are to be logged, suppose that events A and B were written into one log cache structure 631A (as represented by respective arrows 613A and 613B), whereupon the log cache structure 631A is determined as filled (no longer accepting further events). At that point, the log cache structure 631B may become active, and the next events C and D are provided into the log cache structure 631B as represented by respective arrows 613C and 613D. Each log cache structure takes its turn in perhaps round robin fashion.

In one embodiment, there is also a volatile memory 620 in which the same events are written, with the volatile memory also including log caches 621 that mirror the log cache structures of the persistent main memory 630. For instance, volatile log cache 621A may correspond to persistent log cache structure 631A, both containing the same content, and even both perhaps being mirrored while they are being filled with events occupying the same relative space within the log caches. Likewise, volatile log caches 621B through 621D corresponding to persistent log cache structures 631B through 631D, respectively. Because there may be other persistent log cache structures as represented by ellipses 631E and 631F, there may be other volatile log caches as represented by ellipses 621E and 621F.

In the embodiment in which both volatile and persistent log caches are mirrored, events are written into both the volatile log cache and the corresponding persistent log cache structure. For instance, event A may be written into the volatile log cache 621A (as represented by dashed arrow 612A) at about the same time that the event A is written into the persistent log cache structure 631A (as represented by arrow 613A). Likewise, event B may be written into the volatile log cache 621A (as represented by dashed arrow 612B) at about the same time that the event B is written into the persistent log cache structure 631A (as represented by arrow 613B).

Furthermore, at this point, suppose that both corresponding log caches 621A and 631A are deemed full (either through actually being full or through the elapsing of time). At that point, the active mirrored log caches become mirrored log caches 621B and 631B. After that point, in the example of events A through D, event C may be written into the volatile log cache 621B (as represented by dashed arrow 612C) at about the same time that the event C is written into the persistent log cache structure 631B (as represented by arrow 613C). Subsequently, event D may be written into the volatile log cache 621B (as represented by dashed arrow 612D) at about the same time that the event D is written into the persistent log cache structure 631B (as represented by arrow 613D).

While this double writing may seem wasteful, it actually has a number of advantages. For instance, once the log cache is filled as much as it is going to be filled, there are often complex pre-serialization processes in which data of the log cache is moved around for efficient serialization and compact representation in the log. When designing pre-serialization, there are a number of judgment calls that result in different sequences of log cache state in the log cache. Accordingly, pre-serialization happens differently in different environments, over different products, and may even change over time in the same environment or versions or the same product.

If there were but a single log cache in the persistent main memory, these numerous pre-serialization changes would be tracked within that log cache structure. Otherwise, recovery should a failure occur in the middle of pre-serialization would be impossible to do with certainty. This tracking would significantly complicate the process of pre-serialization. Recovery processes would also be complicated because if failure occurred during a pre-serialization process, the recovery process would have to have additional logic to figure out where in the pre-serialization process the log cache structure was, so that recovery could continue from there.

Instead, all of the manipulations involved in pre-serializations may be confined to the volatile log cache. Existing products interact with the volatile log cache already in order to perform pre-serialization manipulations to the cache content and thus this would allow the pre-serialization and serialization to occur normally without change to existing products that perform pre-serialization. Furthermore, if failure was to occur during pre-serialization, resulting in a loss of content of the volatile log cache, the persistent log cache structure could simply be used to repopulate the volatile log cache to provide the volatile log cache with the original state it was in when the previous attempted pre-serialization started. The pre-serialization would then start again, resulting in the events of the volatile log cache being serialized into the log. Again, no changes to existing pre-serialization processes need to occur to allow this recovery to happen; and the complexity of tracking state changes during pre-serialization has been avoided.

Figure 7:
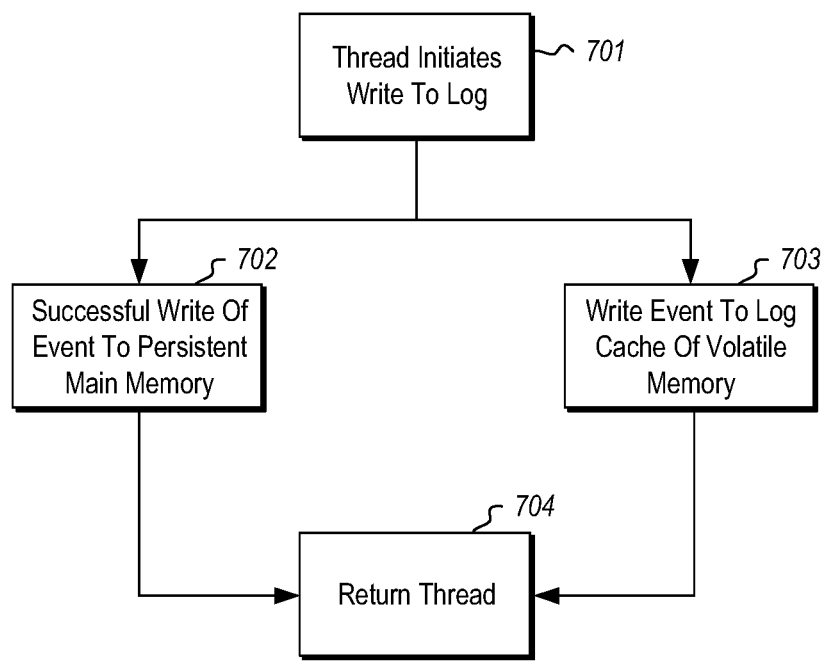
FIG. 7 illustrates a flowchart of a method for logging events of a computing system so as to enable the computing system to recover from a possible failure.

FIG. 7 illustrates a flowchart of a method 700 for logging events of a computing system so as to enable the computing system to recover from a possible failure. The method 700 may be performed by, for instance, the log management component 601 of FIG. 6. Accordingly, the method 700 of FIG. 7 will now be described with frequent reference to the system 600 of FIG. 6.

The method 700 is performed each time the log management component detects that a thread is writing an event to a log (act 701). In response, the event is written into a persistent main memory (act 702). This write occurs in a manner that the event will be written to the log, whether relatively soon during normal operation, or more eventually during recovery (e.g., as described further below) if a failure occurs. This will be referred to hereinafter as a "successful write" to the persistent main memory. Furthermore, if volatile memory is also used in log caching, the event is written into the volatile memory (act 703). In the case where volatile memory is also used, a "successful" write of the event occurs when there has been a successful write of the event to the persistent main memory and where the event has been written to the volatile memory. After a successful write, the thread may be returned back to the event provider (act 704) with very low latency as mentioned above.

Although acts 702 and 703 are illustrated as occurring in parallel, in one embodiment, the write to the volatile log cache in the volatile memory (act 703) actually occurs before the write to the persistent log cache structure in the persistent main memory (act 702). This is helpful in embodiments in which the write to the volatile cache first determines the position. For instance, the Log Sequence Number (or LSN) represents the position of the write in the volatile log cache. In this case, the log management component 601 generates the LSN to represent the position of the event so that proper mirroring can occur. In this embodiment, the log management component 601 would do the following in sequence 1) find the LSN based on current volatile log cache, 2) copy the event content in the current volatile log cache, 3) find the persistent main memory location based on the LSN, and 4) copy the event content also to that position of the persistent main memory.

For instance, FIG. 6 essentially shows four occurrences of the method of FIG. 7. First, the log management component 601 detects that event A is to be written (act 701). The log management component 601 then successfully writes event A to whichever of the persistent log cache structures is presently active (in the example, log cache structure 631A) as represented by arrow 613A (act 702). Furthermore, the log management component 601 also writes the event A to whichever of the volatile log caches is presently active (in the example, log cache 621A) as represented by arrow 612A (act 703). At that point, the thread is returned (as represented by arrow 614A) to the event provider 610A (act 704).

Next, the log management component 601 detects that event B is to be written (act 701). The log management component 601 then successfully writes event B to active log cache structure 631A as represented by arrow 613B (act 702). Furthermore, the log management component 601 also writes the event B to the active volatile log cache 621A as represented by arrow 612B (act 703). At that point, the thread is returned (as represented by arrow 614B) to the event provider 610B (act 704). Next, the log management component 601 detects a change in the active log caches from log caches 621A and 631A to log caches 621B and 631B. In response, the log management component 601 pre-serializes the events of the active log caches 621A and 621B to memory and serializes the events into the log 641 on the persistent store 640, as will be described with respect to FIG. 8.

Thirdly, the log management component 601 detects that event C is to be written (act 701). The log management component 601 then successfully writes event C to whichever of the persistent log cache structures is presently active (in the example, log cache structure 631B due to the detected change in active log caches) as represented by arrow 613C (act 702). Furthermore, the log management component 601 also writes the event C to whichever of the volatile log caches is presently active (in the example, log cache 621B due to the detected change in active log caches) as represented by arrow 612C (act 703). At that point, the thread is returned (as represented by arrow 614C) to the event provider 610C (act 704).

Finally, the log management component 601 detects that event D is to be written (act 701). The log management component 601 then successfully writes event D to active log cache structure 631B as represented by arrow 613D (act 702). Furthermore, the log management component 601 also writes the event D to the active volatile log cache 621B as represented by arrow 612D (act 703). At that point, the thread is returned (as represented by arrow 614D) to the event provider 610D (act 704). At this point, the example of events A through D ends. However, this process may continue indefinitely, one thread and event after the other, with returns of the thread occurring promptly.

Figure 8:
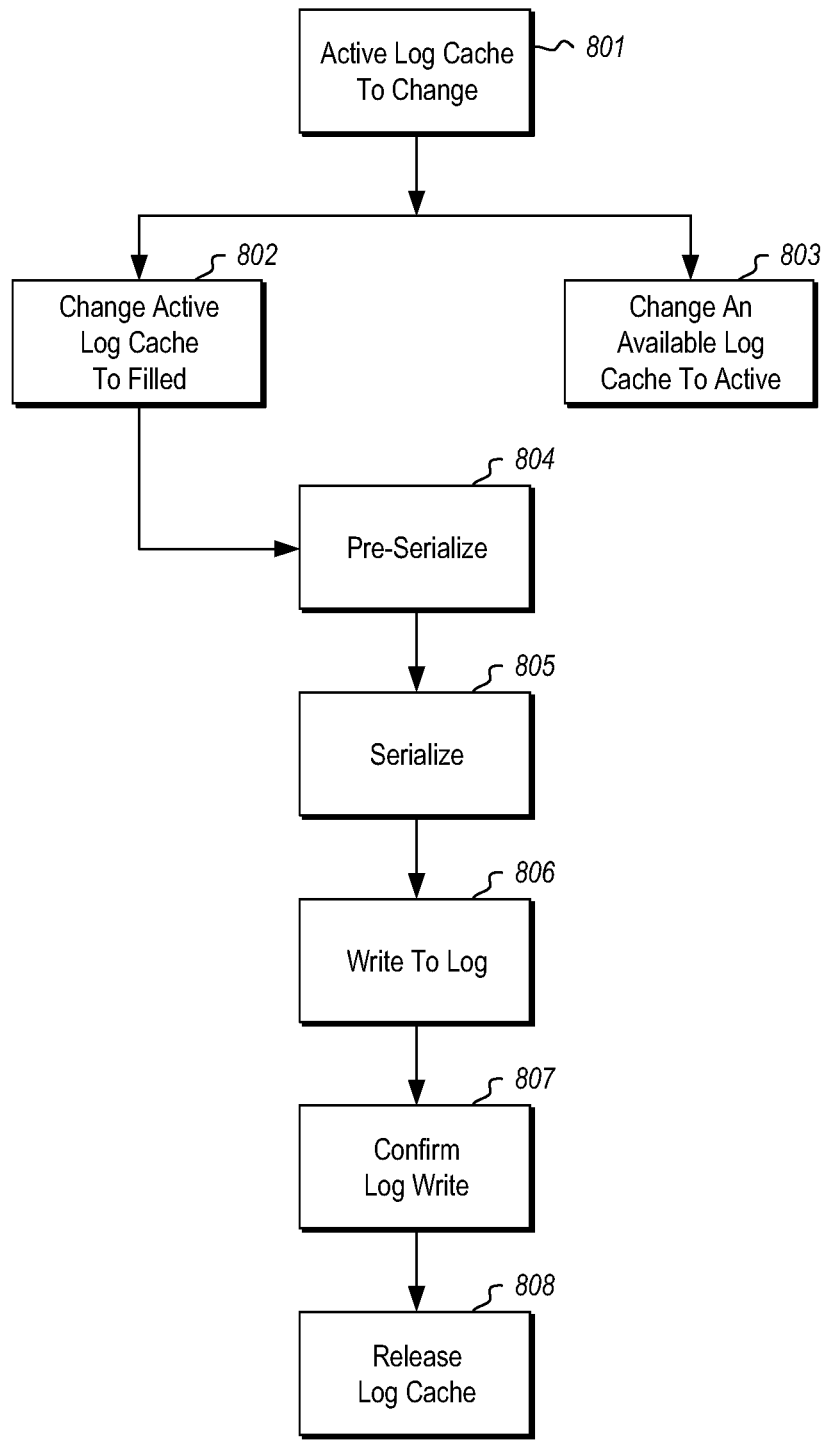
FIG. 8 illustrates a flowchart of a method for serializing a log cache into the log of a persistent store.

FIG. 8 illustrates a flowchart of a method 800 for serializing a log cache into the log. The method 800 may be performed in the context of the system 600 of FIG. 6. Accordingly, the method 800 of FIG. 8 will now be described with frequent reference to the system 600 of FIG. 6. The method 800 may be performed by, for instance, the log management component 601 of FIG. 6.

The method 800 is initiated upon detecting that the active log cache is to change (act 801). This might occur, for instance, if the log cache has become sufficiently full. Alternatively, this might occur upon the earlier of the log cache becoming sufficient full, or a particular amount of time having passed. For instance, in the event A through D example of FIG. 6, the log management component 601 detected that there was to be a change in the active log cache between the time that event B was written to the log cache and the time that event C was written to the log cache.

Upon detecting that the active log cache is to change, the previously active log cache changes its state to filled (act 802), and a previously inactive log cache change its state to active (act 803). A filled state means that the log cache can no longer receive events and is to be written into the log. An active state means that the log cache can receive events. For instance, in the events A through D example of FIG. 6, the persistent log cache structure 631A became filled (act 802) and persistent log cache structure 631B became active (act 803) after event B was written to the log cache but before event C was written to the log cache. In the embodiment in which the volatile memory 620 is also used, volatile log cache 621A became filled (act 802) and volatile log cache 621B became active (act 803) after event B was written to the log cache but before event C was written to the log cache.

The content of the log cache is then pre-serialized (act 804), serialized (act 805), and then written into the log 641 (act 806). Pre-serialization (act 804) is optional but helps to efficiently serialize the events for storage and/or efficiently store the events in the log. Examples of pre-serialization include movement to more efficiently remove empty space (such as slot array movement), checksum generation and insertion, encryption, byte stuffing, compression, and/or the like.

The resulting pre-serialized content is then serialized (act 805) for transmission over the I/O channel to the persistent storage. For instance, in FIG. 6, the optional pre-serialization and serialization of the contents of persistent log cache structure 631A is represented by arrow 615A. However, if the volatile log caches are employed, it is the content of the volatile log cache 621A that will be subject to pre-serialization and serialization as represented by arrow 615B.

Once the content is safely stored in the log (act 806), the log management component confirms the storage (act 807), and then releases the log cache into the available state (act 808). The available state means that the log cache is not currently being written to, but is available to the log management component to change into an active state when the log management component so instructs. For instance, in FIG. 6, once the write 615A or (in the case of employing volatile log caches) write 615B is confirmed as having been completed into the log (act 807), the log caches 621A and 631A each become available to become active once the log management component 601 decides to use them again. In that case, the content of the previously filled log caches are invalidated as they are no longer needed, and may be safely be written over in the future. Alternatively, the log caches may be reinitialized with default values and/or schemas in preparation for future use.

It is usually at this point that all the threads that have written events into that log cache are finally released. However, rather than wait until the log cache is flushed before batch releasing all the entrapped threads, the threads were released upon each completion of method 700, one after the other. In present technology, this reduces latency from milliseconds to potentially single-digit microseconds.

Figure 9:
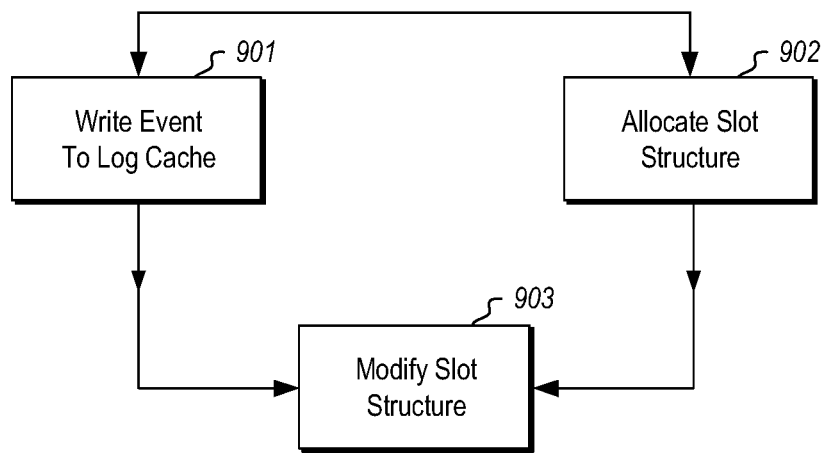
FIG. 9 illustrates a flowchart of a method for successfully writing an event into the persistent memory.

FIG. 9 illustrates a flowchart of a method 900 for successfully writing an event into the persistent memory. The method 900 is an example of the act 702 of FIG. 7, and is used to explain some remaining structures within the persistent main memory 630 illustrated in FIG. 6. The method 900 includes writing the event into a log cache structure of the persistent main memory (act 901), and also allocating a slot structure to the event (act 902). Accordingly, the persistent main memory 630 of FIG. 6 is illustrated as including a plurality of slot structures 632. The slot structures may be relatively small as they are not complex. The slot structure are then modified (act 903) to represents where the event is written in the log cache structure, and to preserve order information representing an order in which the event was written in the context of other events also written to the log cache structure.

In one embodiment, this preservation of ordering and position of slots is preserved using a linked list of slot structures with a log cache descriptor at its root. For instance, there may be one log cache descriptor in the persistent main memory associated with each persistent log cache structure in the persistent main memory. For instance, FIG. 6 shows that the persistent main memory 630 also includes log cache descriptors 633. There is one log cache descriptor corresponding to each of the persistent log cache structures. For instance, log cache descriptor 633A corresponds to persistent log cache 631A. Likewise, log cache descriptors 633B through 633D correspond to respective persistent log cache structures 631B through 631D.

An example of the use of such linked lists to track position and ordering of events within a persistent log cache structure will now be described with respect to FIGS. 10A through 10C, which show example subsequent states of the linked list as two event writes are made to a log cache.

Figure 10A:
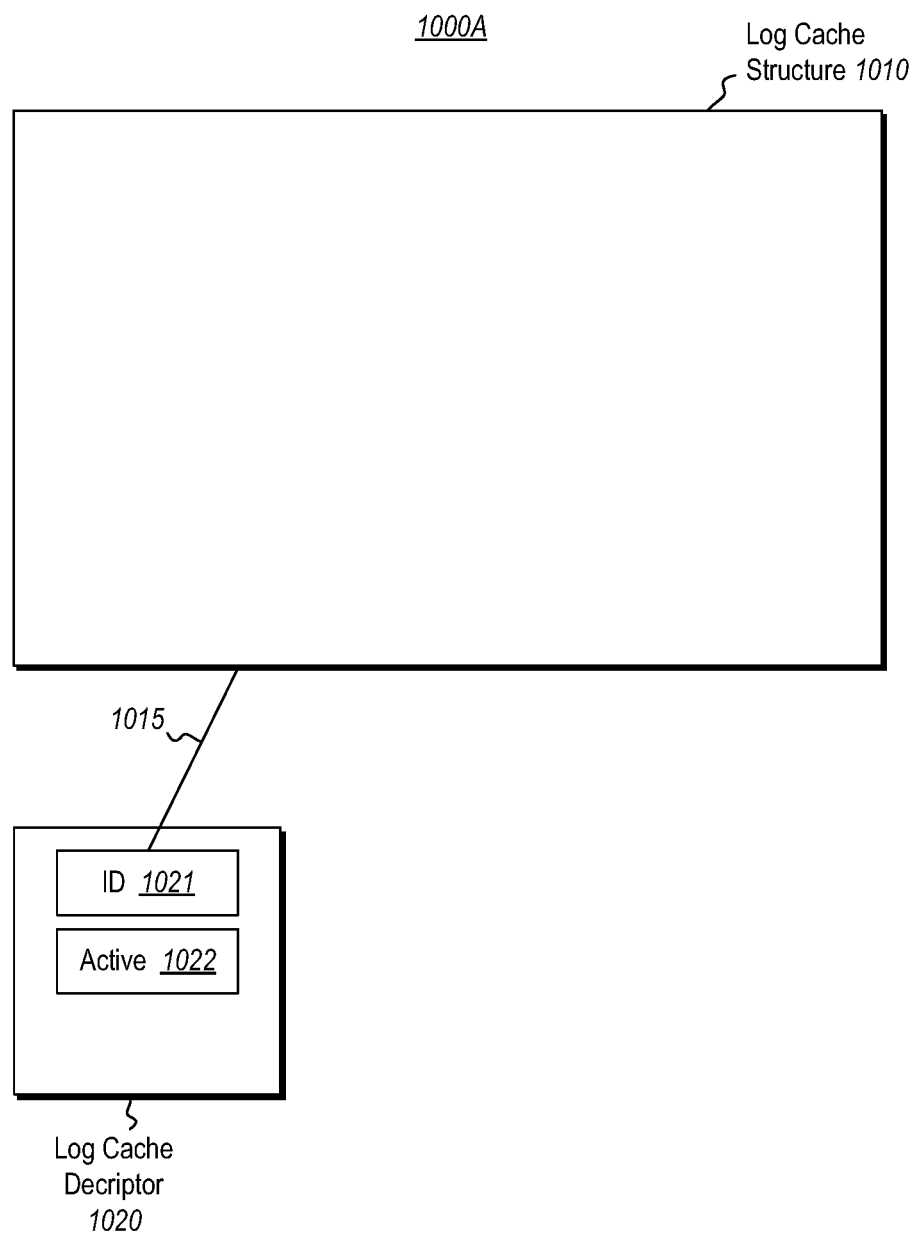
FIG. 10A through 10C show successive states of portions of persistent main memory including a log cache data structure, a log cache descriptor and one or more slot structures, that are interrelated in a manner to describe the state of the log cache structure and preserve ordering of event writes.
Figure 10B:
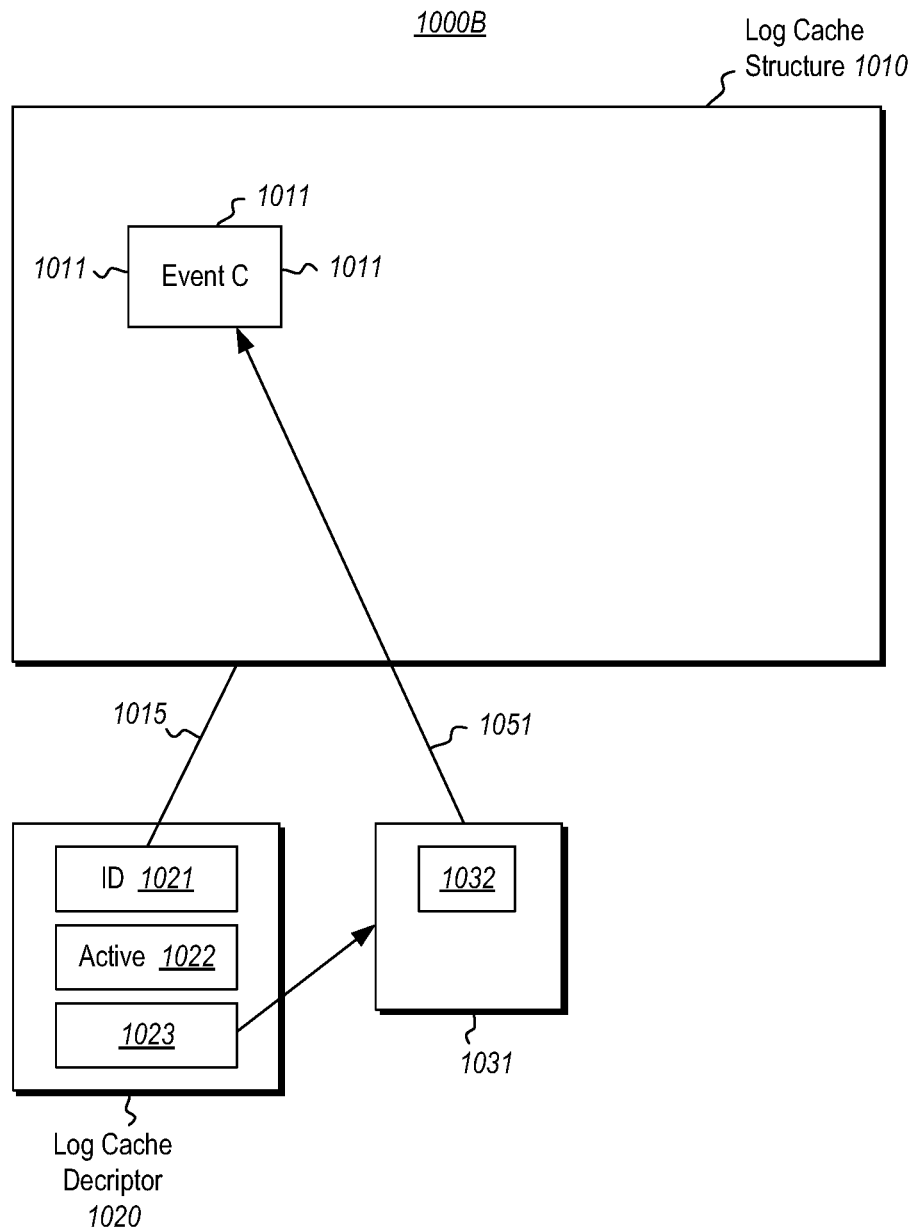
Figure 10C:
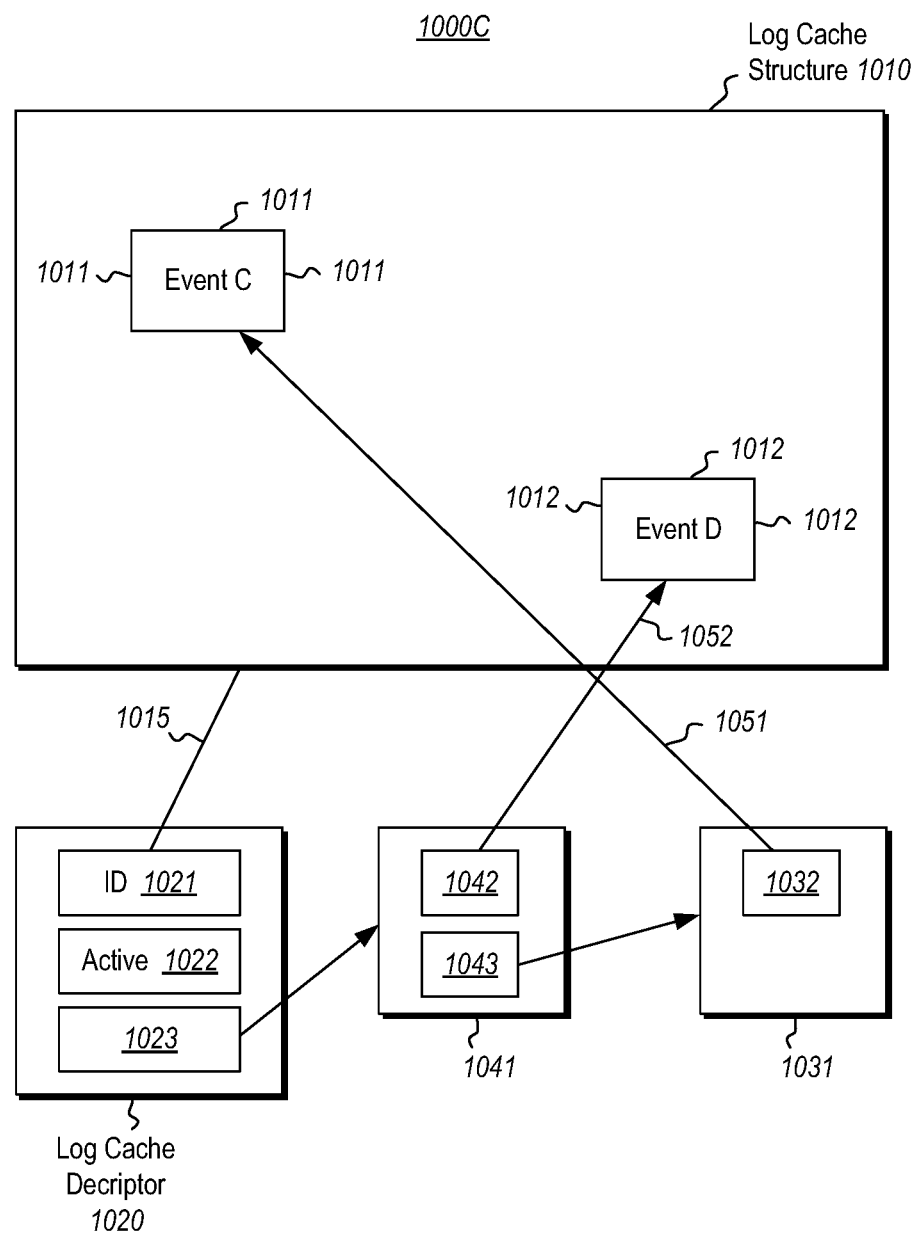

FIG. 10A illustrates an initiate state 1000A in which a log cache structure 1010 is empty, but the corresponding log cache descriptor 1020 indicates a status of active. As an example, log cache structure 1010 may represent the persistent log cache structure 631B of FIG. 6 just after the persistent log cache structure becomes active (before event C is written to it), and is thus still empty. The log cache descriptor 1020 includes a log cache descriptor identifier field 1021 which represents a logical association with the log cache structure (as symbolized by line 1015). The log cache descriptor 1020 also includes a status field 1022 having a value of "active".

Now suppose that an event is to be written to the log cache structure 1010. For instance, event C was first written to the log cache structure 631B in the example of FIG. 6. The event is written to the log cache structure (act 901) and a slot structure is allocated. For instance, in FIG. 10B, the state 1000B shows that event C has been written at position 1011. Furthermore, slot structure 1031 has been allocated. Slot structure 1031 may, for instance, by one of the slot structures 632 of FIG. 6.

The slot structure is modified (act 903) to identify the position of the event written to the log cache structure, and to preserve ordering of events. Referring to FIG. 10B, the slot structure 1031 is associated with the log cache structure 1010 by having it being pointed to by a pointer 1023 within the log cache descriptor 1020 of the log cache structure 1010. The slot structure 1031 also includes a location description 1032 that points to (as represented by arrow 1051) the location 1011 of event C within the log cache structure 1010. This description could include, for instance a pointer to a begin address of the position 1011 as well as a size of the position 1011. At this point, a recovery component (such as recovery component 602) could use the state 1000B to recover the volatile log cache 621B to the state it was in after event C was written, but before event D was written.

Now suppose that another event is to be written to the log cache structure 1010. For instance, event D was next written to the log cache structure 631B in the example of FIG. 6. The event is written to the log cache structure (act 901) and a slot structure is allocated. For instance, in FIG. 10C, the state 1000C shows that event D has been written at position 1012. Furthermore, slot structure 1041 has been allocated. Slot structure 1041 may, for instance, by one of the slot structures 632 of FIG. 6.

The slot structure is modified (act 903) to identify the position of the event written to the log cache structure, and to preserving ordering of events. Referring to FIG. 10C, the slot structure 1041 includes a location description 1042 that points (as represented by arrow 1052) to the location 1012 of event D within the log cache structure 1010. This description could include, for instance, a pointer to a begin address of the position 1012 as well as a size of the position 1012. The slot structure 1041 is first modified to have a pointer 1043 to the previous first slot structure 1031 in the linked list. The pointer 1023 within the log cache descriptor 1020 is then modified to point to the new slot structure 1041. Accordingly, at this point, a recovery component (such as recovery component 602) could use the state 1000C to recover the volatile log cache 621B to the state it was in after events C and D were written, and could also know (based on order in the linked list) that event C occurred before event D.

Accordingly, an effective mechanism for performing event writes using both a primary and a secondary computing system has been described to ensure highly available services and data. The event writes are performed in such a way that threads that initiate event writes may be returned quickly, without awaiting actually logging of the event write at the primary, and without awaiting actual confirmation of writing by the secondary computing system. Thus, writing of event writes is performed with high availability and with efficient use of threads.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method implemented by a computing architecture that improves how event data is preserved by selectively replicating at least some portions of the event data to both a primary computing system and a secondary computing system, both of which are included within the computing architecture, the method comprising:
receiving a plurality of event write requests from one or more event writing components, wherein each event write request in the plurality of event write requests is associated with a corresponding event write that is to be executed on at least one of the primary computing system or the secondary computing system;
for each event write request in the plurality of event write requests, processing each event write request by (1) causing each event write request's corresponding event write to be written to the primary computing system, such that a plurality of event writes are written to the primary computing system, and (2) determining whether each event write request's corresponding event write is also to be written to the secondary computing system; and
after determining that at least some of the plurality of event writes are to be written to the secondary computing system, causing the at least some of the plurality of event writes to be written to the secondary computing system by performing at least the following:
identifying a group of event writes from within the plurality of event writes, the group of event writes omitting at least one event write from the plurality of event writes, such that the group of event writes is a subgroup of the plurality of event writes;
in response to identifying the group of event writes, causing the group of event writes to be transmitted to the secondary computing system; and
causing the group of event writes to be written to the secondary computing system without requiring a confirmation be executed to confirm that the group of event writes have been written to the secondary computing system.

2. The method of claim 1, wherein the secondary computing system is a replica of the primary computing system.

3. The method of claim 1, wherein each event write in the group of event writes is associated with a same transaction.

4. The method of claim 1, wherein writing the plurality of event writes to the primary computing system includes writing the plurality of event writes to a persistent storage of the primary computing system.

5. The method of claim 1, wherein causing the group of event writes to be written to the secondary computing system occurs without the confirmation being executed.

6. The method of claim 1, wherein causing the group of event writes to be written to the secondary computing system occurs with the confirmation being executed.

7. The method of claim 1, wherein the primary computing system is a server operating in a cloud computing environment.

8. A computer system comprising:
one or more processors; and
one or more computer-readable hardware storage devices having stored thereon computer-executable instructions that are executable by the one or more processors to cause the computer system to operate with a computing architecture that performs a method of improving how event data is preserved by selectively replicating at least some portions of the event data to both a primary computing system and a secondary computing system, both of which are included within the computing architecture, and by at least causing the computer system to perform the following:
receive a plurality of event write requests from one or more event writing components, wherein each event write request in the plurality of event write requests is associated with a corresponding event write that is to be executed on at least one of the primary computing system or the secondary computing system;
for each event write request in the plurality of event write requests, processing each event write request by (1) cause each event write request's corresponding event write to be written to the primary computing system, such that a plurality of event writes are written to the primary computing system, and (2) determine whether each event write request's corresponding event write is also to be written to the secondary computing system;

and after determining that at least some of the plurality of event writes are to be written to the secondary computing system, cause the at least some of the plurality of event writes to be written to the secondary computing system by performing at least the following:

identify a group of event writes from within the plurality of event writes, the group of event writes omitting at least one event write from the plurality of event writes, such that the group of event writes is a subgroup of the plurality of event writes;

in response to identifying the group of event writes, cause the group of event writes to be transmitted to the secondary computing system; and cause the group of event writes to be written to the secondary computing system without requiring a confirmation be executed to confirm that the group of event writes have been written to the secondary computing system.

9. The computer system of claim 8, wherein the secondary computing system is a replica of the primary computing system.

10. The computer system of claim 8, wherein each event write in the group of event writes is associated with a same transaction.

11. The computer system of claim 8, wherein writing the plurality of event writes to the primary computing system includes writing the plurality of event writes to a persistent storage of the primary computing system.

12. The computer system of claim 8, wherein causing the group of event writes to be written to the secondary computing system occurs without the confirmation being executed.

13. The computer system of claim 8, wherein causing the group of event writes to be written to the secondary computing system occurs with the confirmation being executed.

14. The computer system of claim 8, wherein causing the group of event writes to be transmitted to the secondary computing system includes making the group of event writes accessible by the secondary computing system without intermediation of the primary computing system.

15. The computer system of claim 8, wherein the group of event writes is serialized.

16. One or more hardware storage devices having stored thereon computer-executable instructions that are executable by one or more processors included within a computing architecture to cause the computing architecture to perform a method of improving how event data is preserved by selectively replicating at least some portions of the event data to both a primary computing system and a secondary computing system, both of which are included within the computing architecture, and by at least causing the computing architecture to perform the following:

receive a plurality of event write requests from one or more event writing components, wherein each event write request in the plurality of event write requests is associated with a corresponding event write that is to be executed on at least one of the primary computing system or the secondary computing system;

for each event write request in the plurality of event write requests, processing each event write request by (1) cause each event write request's corresponding event write to be written to the primary computing system, such that a plurality of event writes are written to the primary computing system, and (2) determine whether each event write request's corresponding event write is also to be written to the secondary computing system;

and after determining that at least some of the plurality of event writes are to be written to the secondary computing system, cause the at least some of the plurality of event writes to be written to the secondary computing system by performing at least the following:

identify a group of event writes from within the plurality of event writes, the group of event writes omitting at least one event write from the plurality of event writes, such that the group of event writes is a subgroup of the plurality of event writes;

in response to identifying the group of event writes, cause the group of event writes to be transmitted to the secondary computing system; and cause the group of event writes to be written to the secondary computing system without requiring a confirmation be executed to confirm that the group of event writes have been written to the secondary computing system.

17. The one or more hardware storage devices of claim 16, wherein the secondary computing system is a replica of the primary computing system.

18. The one or more hardware storage devices of claim 16, wherein each event write in the group of event writes is associated with a same transaction.

19. The one or more hardware storage devices of claim 16, wherein writing the plurality of event writes to the primary computing system includes writing the plurality of event writes to a persistent storage of the primary computing system.

20. The one or more hardware storage devices of claim 16, wherein causing the group of event writes to be written to the secondary computing system occurs without the confirmation being executed.

* * * * *